United States Patent [19]
Heironimus

[11] Patent Number: 6,037,874
[45] Date of Patent: Mar. 14, 2000

[54] ELECTRONIC LEVEL WITH LASER INCLINATION INDICATOR

[75] Inventor: Gregory Heironimus, San Jose, Calif.

[73] Assignee: Zircon Corporation, Campbell, Calif.

[21] Appl. No.: 09/107,650

[22] Filed: Jun. 30, 1998

[51] Int. Cl.[7] .............................. G08B 21/00; G01C 9/06
[52] U.S. Cl. ..................... 340/686.1; 340/686.2; 340/689; 33/366.16; 33/366.23
[58] Field of Search .............................. 340/686.1, 686.2, 340/691.1, 815.4, 815.45, 689; 33/366.16, 366.11, 366.19, 366.23

[56] References Cited

U.S. PATENT DOCUMENTS

| | | | |
|---|---|---|---|
| 4,912,662 | 3/1990 | Butler et al. | 702/154 |
| 5,083,383 | 1/1992 | Heger | 33/366.19 |
| 5,168,632 | 12/1992 | Rimlinger, Jr. | 33/288 |
| 5,259,118 | 11/1993 | Hrger | 33/366 |
| 5,313,713 | 5/1994 | Heger et al. | 33/366.14 |
| 5,410,532 | 4/1995 | Ono et al. | 369/112 |
| 5,479,715 | 1/1996 | Schultheis et al. | 33/366.16 |
| 5,488,779 | 2/1996 | Schultheis et al. | 33/366.19 |
| 5,680,208 | 10/1997 | Butler et al. | 356/250 |
| 5,689,330 | 11/1997 | Gerard et al. | 356/138 |

Primary Examiner—Jeffery A. Hofsass
Assistant Examiner—Van T. Trieu
Attorney, Agent, or Firm—Skjerven, Morrill, MacPherson, Franklin & Friel LLP; Norman P. Klivans; Daniel P. Stewart

[57] ABSTRACT

An electronic level with a laser inclination indicator. In one embodiment, the level includes a sensor that determines an inclination of the device relative to a null inclination. The sensor generates an inclination indication signal. A housing in which the sensor is mounted defines a longitudinal axis. A laser mounted on the housing generates a light beam parallel to the longitudinal axis. A laser controller receives the inclination indication signal from the sensor and selectively provides power to the laser in response to the inclination indication signal. In one embodiment, the level also includes a visual display on the housing operatively connected to the sensor and displaying the determined inclination. The visual display has a plurality of illuminated non-parallel and adjacent segments, each segment representing a predetermined sequential increment of inclination. Each segment is arranged at a different angle relative to the longitudinal axis of the housing. A particular number of segments are illuminated for each determined inclination. The laser beam spot provides a remote indicator of the inclination of the level for a user who is not in a position to view the visual display.

17 Claims, 6 Drawing Sheets

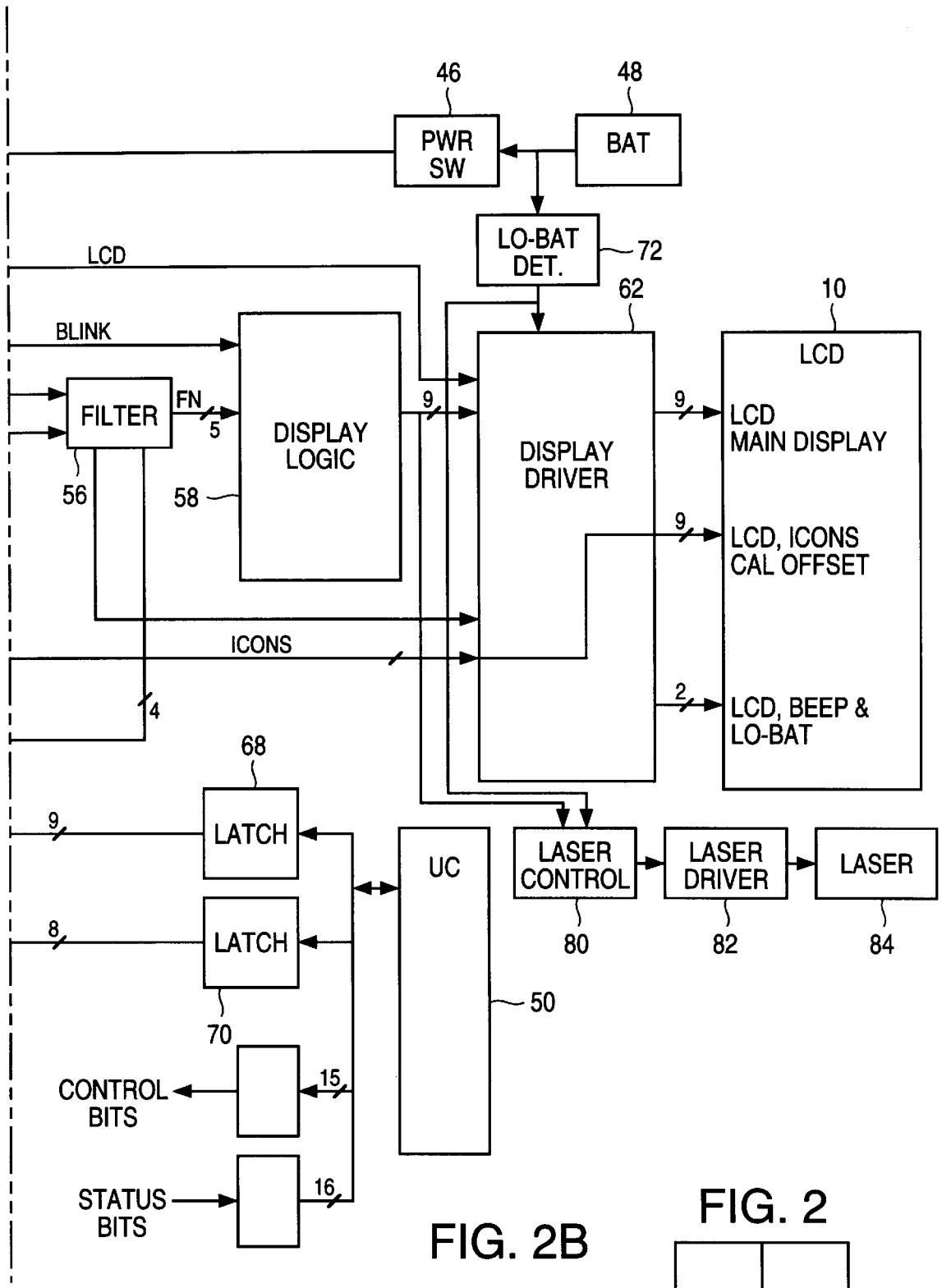
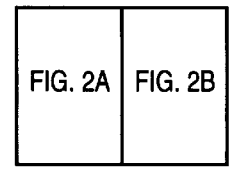
FIG. 2B
FIG. 2

ELECTRONIC LEVEL WITH LASER INCLINATION INDICATOR

TECHNICAL FIELD

This invention relates to electronic levels, and in particular to an electronic level with a laser inclination indicator.

BACKGROUND

Electronic levels known in the art include that sold by Wedge Innovations Inc. and as disclosed in U.S. Pat. No. 4,912,662 issued Mar. 27, 1990 to Butler et al. (assigned to Wedge Innovations Inc.). Such prior art electronic levels display show the inclination in degrees or percent slope, which are typically not the inclination measurements used by building tradesmen or others. Prior art devices thus often do not provide a satisfactory indication of deviation from level or plumb in a useful manner.

An electronic level disclosed in International (PCT) Patent Application No. PCT/US93/07434 published Mar. 3, 1994 having International Publication Number WO94/04888 and entitled "Electronic Level . . . ", invented by Charles E. Heger et al., includes a graphical display of rise over run (deviation from a null) in inches per the actual length of the level instrument (such as two or four feet). The display includes a number of parallel line segments resembling a typical ruler scale as the primary indication. When the device is at a null (level or plumb or at some other preselected inclination), only the central line segment is illuminated. When the device is inclined at an angle from the null, one or more of the line segments are illuminated starting from the center line segment. The more line segments that are illuminated starting from the center line segment, the greater the amount of inclination indicated. Each line segment in one embodiment indicates 1/64th inch of additional inclination per horizontal foot. The line segments on either side of the central line segment thus provide an indication of inclination in either direction, i.e. that the left end or right end of the device is inclined. Additionally, numerals associated with the scale show the amount of inclination per arbitrary length (such as two feet or four feet) related to the instrument length. Also included is a slope indicator and a numerical indicator for indicating a fixed offset mode. Also included is a direction of rotation indicator for showing by means of arrows and associated line segments in which direction one must rotate the device to achieve the null position.

However, these earlier devices do not fully solve the problem of a display of the inclination of the device which may be easily read and intuitively understood, even at a distance from the device.

SUMMARY

Thus, a need has arisen for an electronic level that addresses the disadvantages and deficiencies of the prior art. Accordingly, an electronic level with a laser inclination indicator is disclosed. In one embodiment of the present invention, the level includes a sensor that determines an inclination of the device relative to a null inclination. The sensor generates an inclination indication signal. A housing in which the sensor is mounted defines a longitudinal axis. A laser (or other light source) mounted on the housing generates a light beam parallel to the longitudinal axis. A laser controller receives the inclination indication signal from the sensor and selectively provides power to the laser (or other light source) in response to the inclination indication signal.

In one embodiment, the level also includes a visual display on the housing operatively connected to the sensor and displaying the determined inclination. The visual display has a plurality of illuminated non-parallel and adjacent segments, each segment representing a predetermined sequential increment of inclination. Each segment is arranged at a different angle relative to the longitudinal axis of the housing. A particular number of segments are illuminated for each determined inclination.

A technical advantage of the present invention is that the laser (light) beam spot provides a remote indicator of the inclination of the level for a user who is not in a position to view the visual display. Another technical advantage of the present invention is that the laser (light) beam spot may also indicate a low battery condition and conserve power in a low battery condition.

DETAILED DESCRIPTION

The level disclosed herein includes improvements over the levels disclosed in commonly owned U.S. Pat. No. 5,083,383 issued Jan. 28, 1992 to Charles E. Heger and entitled "Electronic Capacitance Level With Automatic Electrode Selection," and commonly owned U.S. Pat. No. 5,479,715 issued Jan. 2, 1996 to Gary R. Schultheis and Charles E. Heger and entitled "Electronic Level Displaying Inclination Using a Multi-Segment Fan-Like Display." Also, certain features of the level disclosed in commonly owned U.S. patent application Ser. No. 07/810,739 filed Dec. 18, 1991 and entitled "Electronic Level With Display, . . . ", now U.S. Pat. No. 5,259,118, issued Nov. 9, 1993, invented by Charles E. Heger are used herein. Each of these patent documents is incorporated herein by reference. A capacitive sensing system in accordance with the present invention is described in U.S. Pat. No. 5,083,383 and therefore is not further described here. Also, the present level has many common features to that disclosed in U.S. Pat. No. 5,313,713, incorporated by reference.

Display

Figure 1A:
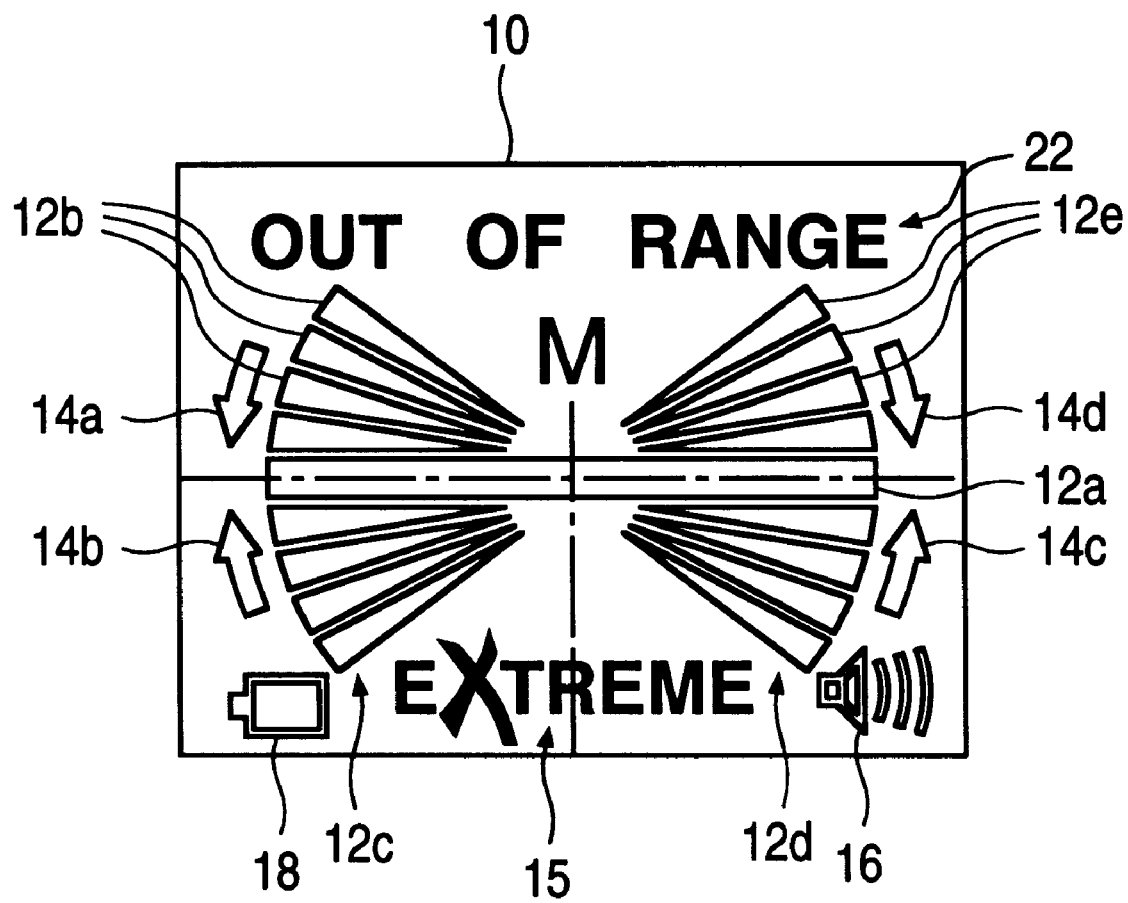
FIGS. 1A, 1B, 1C, 1D, show level displays in accordance with the invention.

FIG. 1A shows all of the segments of display 10 of the level in accordance with the invention. It is to be understood that display 10 is conventionally mounted on a convenient outer surface of the level housing, the mechanical structure of which is typical of that used in electronic levels which are commercially available, for instance from Wedge Innovations and Zircon Corporation.

Display 10 includes a central level (or plumb) indicator segment 12a and a plurality of inclination indicator segments arranged in a fan-like configuration on either side of the central segment 12a. In this embodiment, there are four inclination segments in each group 12b, 12c, 12d, 12e. The segments in groups 12b and 12d operate in conjunction (as described below), as do the segments in groups 12c and 12e. Thus, while sixteen inclination indicator segments are shown in FIG. 1A, these comprise only eight actual inclination indicators. It is to be understood that in another embodiment only the segments in e.g. groups 12b, 12c (to the left-hand portion of display 10) are present; the other two groups 12e, 12d are thus functionally redundant but provide additional visual emphasis. In addition to the inclination indicator segments, directional arrows 14a–d are provided for additional visual emphasis to indicate the direction of rotation of the device required to attain a zero inclination (level or plumb) orientation. Thus, as will become apparent from the discussion below, when any of the inclination indicator segments 12b and 12d are illuminated, directional arrows 14a and 14c are also illuminated. Likewise, when any of the inclination indicator segments 12c and 12e are illuminated, directional arrows 14b and 14d are also illuminated.

Also included on display 10 are an inclination display resolution indicator 15, a conventional beeper (loudspeaker) volume icon 16, a low battery icon 18, and a calibration icon 22, the operation of which is described below.

Figure 1B:
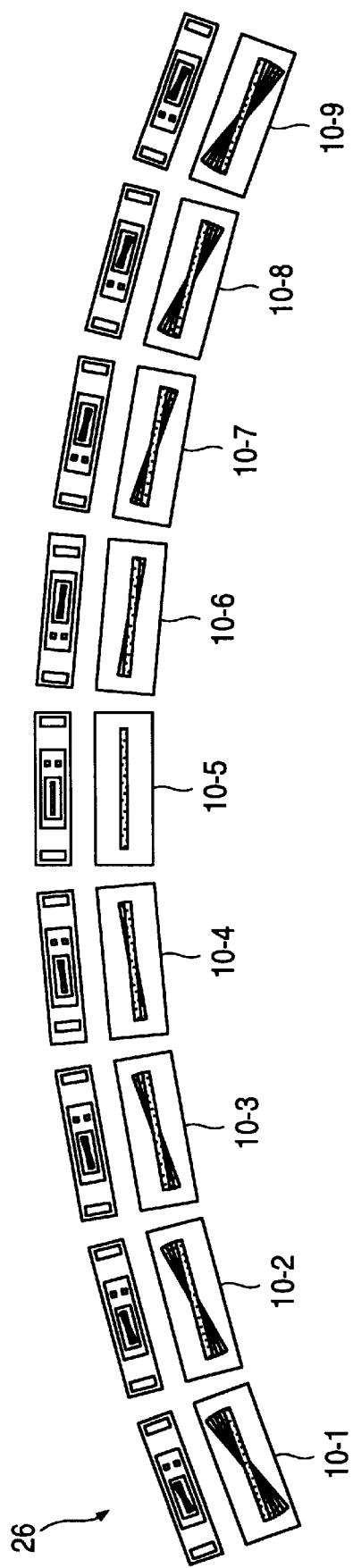

The use of display 10 of FIG. 1A is illustrated in FIG. 1B which illustrates, in the upper row, a plurality of positions of the level 26, where level 26 includes the display 10 mounted on conventional level housing 28. (It is to be understood that level 26 is shown here only diagrammatically and the amount of inclination is exaggerated in FIG. 1B.) FIG. 1B shows level 26 in nine positions relative to the direction of the earth's gravitational field, with the central position being the level position and the other positions on either side of the level position being varying degrees of inclination. Immediately below each depiction of level 26 is the corresponding appearance of display 10, showing the fan-like configuration of the central and inclination segments 12a, 12b, 12c, 12d, 12e (not labeled in FIG. 1B). As shown in the central position of level 26, the corresponding display 10-5 has only the central segment 12a illuminated. The furthest degree of inclination is shown in displays 10-1 and 10-9. Thus, in display 10-1 level 26 is rotated in the counterclockwise direction, and display 10-9 correspondingly shows level 26 rotated in the clockwise direction about a central horizontal axis. The other displays 10-2, 10-3, 10-4, and 10-6, 10-7, 10-8 show intermediate degrees of inclination. It can be seen that this readily provides an intuitive graphical indication of the amount of inclination of the level.

IG. 1C shows detail of display 10, here designated 10a, corresponding to display 10-1 of FIG. 1B, at the maximum inclination with each segment in groups 12c, 12e and central segment 12a illuminated.

Figure 1C:
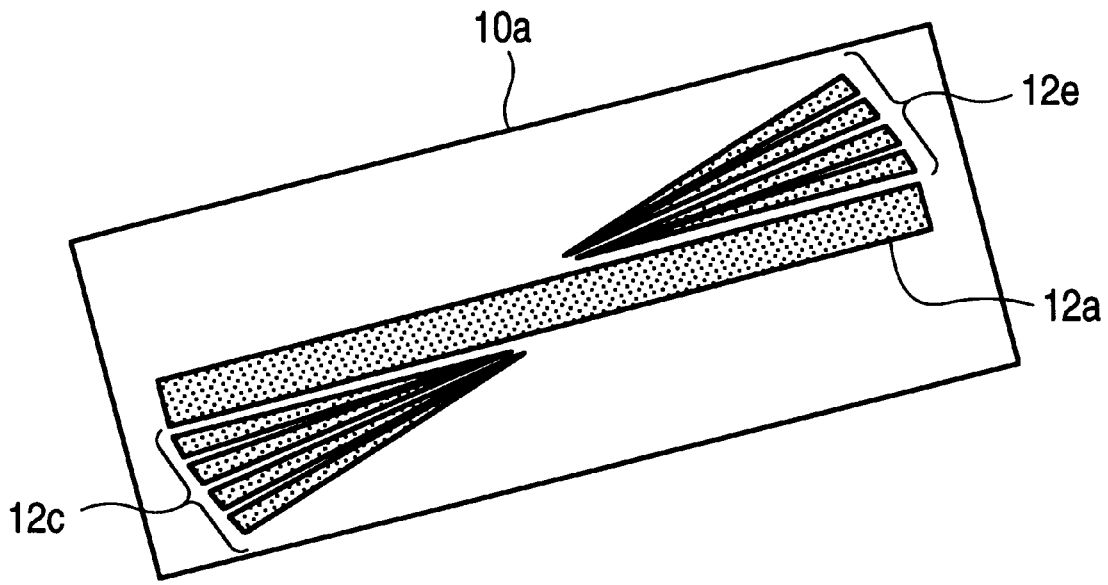
Figure 1D:
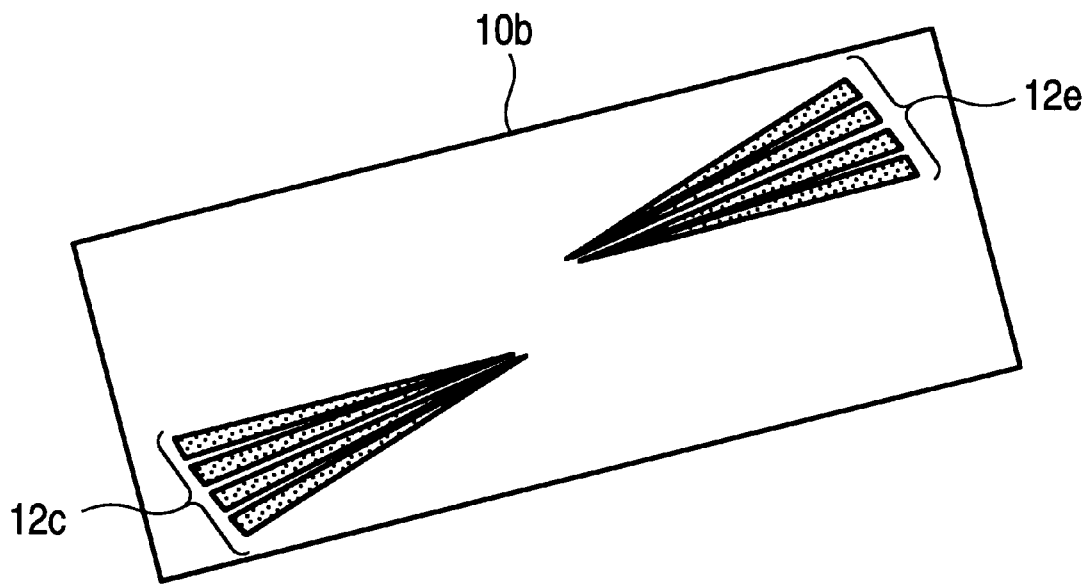

Another embodiment is shown in FIG. 1D with the central segment 12a absent from display 10b. It can be seen that in this case the display 10b still provides an easily understood indication of the deviation from the level position, even without the presence of the central segment 12a. In this case the level position is shown by the illumination of only the central segment 12a.

It is to be understood that the central segment 12a and the inclination segments 12b, 12c, 12d, 12e (as well as the other elements of display 10) may be provided by any type of display such as an LCD display, an LED display, or illuminated segments using other forms of illumination. In the context of the present application, "illuminated" refers to the presence of the displayed object (the segment being "on"). Thus, in the case of an LCD display as shown here, the "illuminated" portion is actually darker (as shown in FIG. 1C) than are the "non-illuminated" portions.

Also provided (FIG. 1A) is an out of calibration indicator 22, which by illuminating the phrase "OUT OF RANGE" indicates that the device has invalid calibration at that particular inclination and hence that valid information cannot be shown by the fan-like display inclination segments. This may occur, for example, if the device has not yet been calibrated, so that no calibration data has been obtained, or if the device fails to calibrate when calibration is attempted.

Loudspeaker icon 16 conventionally indicates activation of the tone generator. It is to be understood that the above described visual indications may be provided by a number of different electronic circuitry arrangements, one of which is described hereinafter.

Circuitry

Figure 2A:
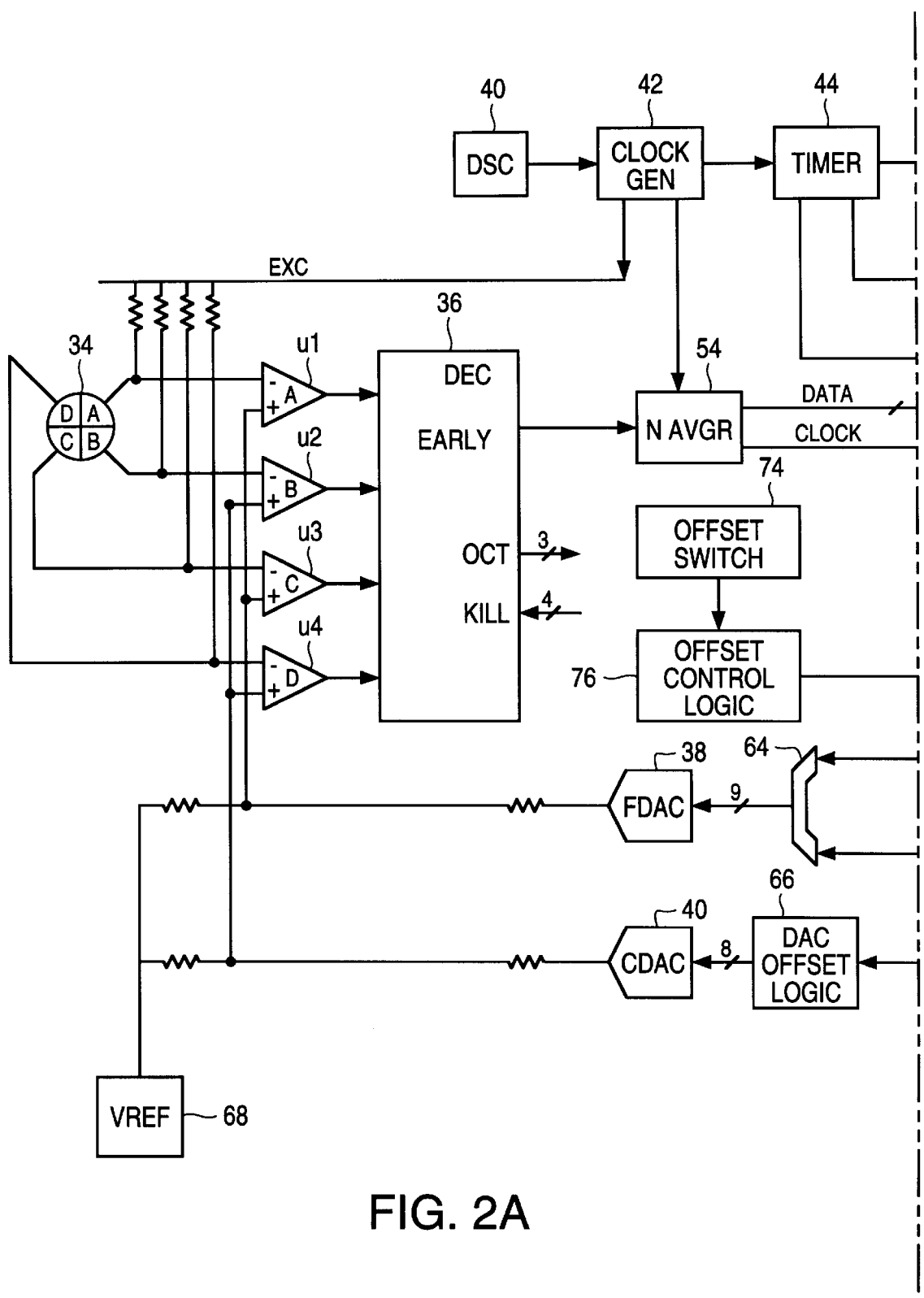
FIG. 2 shows a block diagram of circuitry in accordance with the invention.

The following description of electronic circuitry is of one embodiment of the invention and provides a rapidly responding visual display and tone processing, with accurate indication of inclination. A combination of an application specific integrated circuit (ASIC) including logic circuitry, and a programmed microcontroller is utilized for the electronic portions of the level in one embodiment, a block diagram of which is shown in FIG. 2. It is to be understood that one of ordinary skill in the art could code the microcontroller computer program in light of the detailed operating steps described hereinafter. Another version of circuitry suitable for use in the present level is described in detail in U.S. Pat. No. 5,313,713.

The four exponential R-C timing signals from the sensor 34 electrodes A to D are processed by respectively conventional comparators U1, U2, U3, U4 (as described in U.S. Pat. No. 5,083,383), utilizing an automatic electrode selection technique. The reference voltage for each pair of diagonally opposed comparators U1, . . . , U4 is derived from two digital-to-analog converters (DAC's) 38, 40 with sensor comparators U1 and U3 driven by a 9 bit DAC 38 called FDAC (fine DAC) and electrode comparators U2 and U4 driven by an 8 bit DAC 40 called CDAC (coarse DAC).

Each DAC 38, 40 receives its digital data input from a latch circuit 68, 70, respectively, for retaining the digital data, and whose outputs are connected to an R-2R DAC resistor network to derive the analog voltage. The output signals from comparators U1, U2, U3 and U4 associated respectively with sensor quadrants (electrodes) A, B, C, D are provided to sensor decoder logic (DEC) circuitry 36. This performs the octant decoding function as described below. Decoder circuitry 36 provides two outputs; the single bit "early/late" clock signal ("Early") and the 3 bit octant indicator ("Oct"). N averager 54 averages the sensed inclination Early signal over N time periods, as described below. Averager 54 provides two output signals; one is a "Data" signal indicating the averaged inclination value as an 1 bit value, and a Clock signal. Both the Data signal and Clock signal are provided to the moving average filter circuitry 56 described in detail below. The output signal of the moving average filter 56 is a 5 bit value FN provided to display logic 58.

Shown at the top portion of FIG. 2 is conventional battery 48 connected via a power switch 46 to provide power. A conventional low battery detection circuit 72 is connected to battery 48. Also shown is conventional oscillator 40 which drives a clock generator 42. Clock generator 42 in turn drives timer circuit 44, which provides timing for the LCD display driver circuitry 62 (signal "LCD") and also a "Blink" signal which is the timing signal for the display logic 58. The clock generator 42 also provides the excitation signal on line EXC to four resistors for providing the excitation voltage to each of the sensor electrodes A, B, C, and D. The timer 44 is also connected to the power switch 46 in order to turn the power off if the level is inactive for a particular amount of time.

Display logic 58 provides the display/tone processing functions described below and drives (via a 9 bit bus) the conventional display driver circuitry 62. The display driver circuitry 62 also receives the "icons" multi-bit input signal from the offset control logic 76, the beep control signal, the low battery detector signal, and an output signal FN from the filter 56. The 5 bit filter 56 signal FN can have 32 states. Seventeen of these states are used and encoded into nine segments of display 10 using a weighting process, disclosed below.

The conventional LCD 10 includes the "LCD" main display fan-like display segments 12a, 12b, 12c, 12d, 12e. The LCD 10 also includes the "LCD Icons" segments as described above for calibration ("Cal"), for user/fixed offset modes ("Offset") and other segments for the "Beep" (loudspeaker) and low battery ("LO-BAT") indications as shown in FIG. 2.

The lower portion of FIG. 2 shows the conventional 8 bit microcontroller 50 connected conventionally by a bi-directional serial I/O circuit (not shown) to latches 68 and 70. Latch 68 is connected (via adder 64 which adds the output of latch 68 to the output of filter 56) to the fine digital to analog converter 38 (FDAC).

Similarly, latch 70 is connected via digital to analog converter offset logic 66 (the operation of which is described below) via an 8 bit bus to the 8 bit coarse digital to analog converter CDAC 40.

The FDAC 38 and CDAC 40 drive respectively (via a four resistor network) the positive input terminals of respectively comparators U1 and U3 and comparators U2 and U4. Voltage supply Vref supplies a voltage equal to one-half the system supply. Both the CDAC and FDAC can, via the resistor network, slightly modify the − (minus) input terminal voltages to the comparators.

The 15 control bits from microcontroller 50 perform the functions of enabling/disabling the display calibration icon 22 (i.e., the "Icons" signal input to the display driver circuitry), and provide the sensor "KILL" signal for the user offset mode (described below). The 16 status bits input to microcontroller 50 provide an indication so the microcontroller can monitor functions including the calibration process, the Early signal, and the averager output signal.

Averaging

The output of the sensor decoder logic circuitry 36 will be a binary "1" or "0" after the sensor excitation pulse provided on line EXC, depending upon the orientation of sensor 34. To help remove system noise, the result of a number of excitation pulses are averaged by averager 54. In one version the number of cycles N averaged is 64, with the following criteria: if the number of accumulated "1"'s is less than 16 over a 64 cycle period, the averaged data is a "0"; if the accumulated "1"'s is greater than 48 the average data is a "1"; if the accumulated "1"'s is between 16 and 48 the previous averaged data result will be used. This allows a 50% "noise band" to exist, suppressing small physical (motional) and system noise.

Averaging Calibration

In normal mode operation (indicate level/plumb), the CDAC 40 digital value is fixed at half scale by microcontroller 50 of FIG. 2 by writing the value 80 hex into the CDAC latch 70. During user calibration for any given axis (Level, Plumb, etc.) the FDAC 38 is cycled by microcontroller 50 in a successive approximation routine (SAR) starting with the most significant bit (MSB), and the 9 bit result is temporarily stored by the microcontroller 50. The level is then rotated 180° in the plane of the current working surface by the user, and the FDAC 38 is again cycled through the SAR and the result temporarily stored. These two temporary results are then averaged via a conventional math routine in the microcontroller 50 to ascertain their mean value. This mean value is then conventionally stored in non-volatile memory associated with microcontroller 50 (not shown) and becomes the calibration word (value) for the particular axis calibrated.

This routine is repeated for each of the four primary axes of the level. If calibration data is not present for any reason, the "OUT OF RANGE" calibration indicator 22 on display 10 is illuminated, as previously described.

Octant Decoding

Figure 4A:
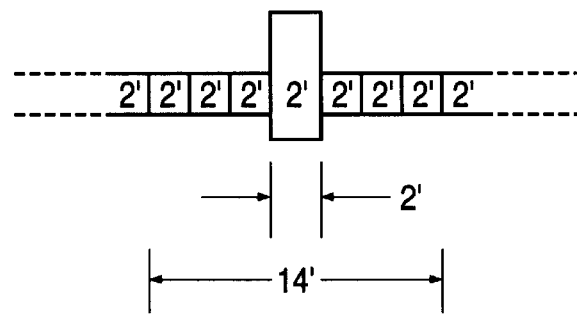
FIGS. 4A and 4B show non-linear display processing in accordance with the invention.
Figure 4B:
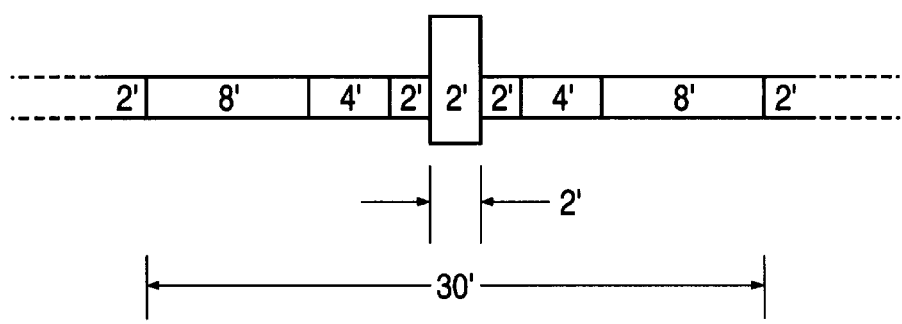

The output signals of the four sensor comparators U1, . . . , U4 are decoded by decoder logic 36 to sense the octant within which the sensor 34 is currently oriented. (An example of this decoding is shown in FIGS. 4A and 4B(1) and 4B(2) of U.S. Pat. No. 5,313,713.) Decoding is accomplished by sensing the timing relationships of the four sensor 34 electrodes A, B, C, D. There are eight decoded "zones", each zone being 90°, with four zones being in quadrature (45° shifted) from the other four zones.

Display/Tone Processing

Control of the inclination display and available tones is by display logic circuitry 58. After a successful calibration cycle and storage of the calibration word for any particular quadrant, the following sequence occurs:

Initially one starts with the eight bit calibration word from the microcontroller 50, and a value of binary 1000 (8 hex) is added to the calibration word, which represents a "level" display and tone, and the sum of these two values is added in adder 64 resulting in the FDAC binary word (value) sent to the FDAC 38. A value of binary 10 (2 hex) is now added to the FDAC word by the filter 56. Three possible results from these two readings may occur. 1) If the result out of the averager 54 of these two successive data bits is 01, no change in the display/tone occurs and the FDAC word is decremented by 10 binary. 2) If the result is 00, the display is incremented by one segment to the right and the FDAC word incremented by 10 binary. 3) If the result is 11 the display is decremented by one segment and the FDAC word decremented by 10 binary.

This process continues indefinitely, continuously updating the display and tracking the 0/1 null with two successive data pairs of data results. If the FDAC word reaches either ±8 decimal away from the calibrated "level" FDAC word, the FDAC word is not incremented (decremented) any more until the data comes back into a ±8 decimal range of the FDAC calibration word. Each 2 bit wide "bin" of the FDAC word about a ±16 bit range of the calibration word corresponds to a display segment and tone frequency in one embodiment.

Assume that the physical position of the sensor 34 was such that the change in data from a 0 to a 1 occurs when the FDAC word equals the calibration word plus 1000 binary. When the FDAC word is then less than the calibrated word, the averaged data is a 0 until the FDAC word equals the calibration word. Thereafter the averaged data is a 1. This corresponds to a "level" condition and all 8 inclination segments on either side of the central segment would be unilluminated, with only the center level segment illuminated, indicating "level".

If the sensor 34 were now slightly rotated counter-clockwise (CCW), the change in data from a 0 to a 1 would occur earlier in the 16 bin FDAC cycle, and those inclination segments 12c, 12e corresponding to the FDAC bins where data was a 1 would be illuminated. If the sensor 34 was significantly rotated CCW from the "level" position (assuming that the quadrant has not changed) all four display segments in each of groups 12c, 12e would be illuminated.

Therefore, nine unique states exist within each quadrant that describe the position of the sensor 34 relative to "level".

Display logic circuitry 58 accordingly generates a nine-bit parallel output signal, which is received by display driver 62. This output signal has four bits for illuminating the four inclination indicator segments in segment group 12b on display 10. These same four bits also illuminate the corresponding four inclination indicator segments in segment group 12d. Likewise, the output signal from display logic circuitry 58 has four bits for illuminating the four inclination indicator segments in segment group 12c and the corresponding segments in segment group 12e. The output signal also includes one bit for illuminating the central segment 12a.

The output signal from display logic circuitry 58 is received by display driver circuitry 62, which includes driving transistors for driving the aforementioned segments in display 10. Thus, display driver circuitry 62 has a nine-bit parallel output to the LCD main display of display 10, the nine bits corresponding to the nine-bit output of display logic circuitry 58.

The output of display logic circuitry 58 is also received by laser control circuitry 80. Laser control circuitry 80 may be, for example, a microcontroller programmed to perform the functions described below, or an ASIC designed to perform those functions. Laser control circuitry 80 controls laser driver circuitry 82, and therefore laser 84, to provide a remote indication of the information displayed on display 10, as will be described more fully below.

Laser 84 is mounted on the level housing in alignment with the level surface or surfaces of the level housing. Laser 84 may be aligned either parallel or perpendicular to the level surface of the level housing, or at some other desired angle with respect to the level surface. Laser 84 may be, for example, a red-light laser diode of conventional design, powered by laser driver circuitry 82. Laser 84 projects a beam (not shown) which may be used as a level line (or plumb line) at some distance from the level. Nearly any surface that intersects the laser beam will show a beam spot indicating the intersection point of the surface with the beam. Laser 84 therefore allows one to find a level line or plane (or plumb line) extending 150 feet or more from the level.

Laser control circuitry 80 allows the beam projected by laser 84 to be used not only to find a level line or plane, but also to provide information displayed on display 10. Specifically, laser control circuitry 80 indicates to a user who cannot see the various segments 12a–12e on display 10 the current position of the level with respect to gravity.

Thus, if the level is currently level (or plumb), as indicated by display 10-5 in FIG. 1B, display segment 12a is illuminated and the remaining display segments 12b–12e are unilluminated. In this state, laser control circuitry 80 causes laser driver circuitry 82 and laser 84 to produce an uninterrupted (or solid) beam. An uninterrupted beam spot may therefore be interpreted by an observer as an indication that the level is currently level (or plumb).

Note that other suitable light sources may be substituted for laser 84. For example, a mercury lamp or other incoherent light source may be used in place of laser 84 to create a solid or blinking light beam as described herein. A parabolic reflector and/or beam collimator may be used in conjunction with the incoherent light source to provide a focused beam spot similar to the laser beam spot described herein.

If the level is at some degree of inclination, as indicated by displays 10-1, 10-2, 10-3, 10-4 and 10-6, 10-7, 10-8, 10-9 in FIG. 1B, at least a first segment in either segment group 12b or segment group 12c is illuminated. Likewise, in this state, at least a first segment in either segment group 12d or segment group 12e is illuminated. When a first segment in either segment group 12b or 12d is illuminated, laser control circuitry 80 causes laser driver circuitry 82 and laser 84 to produce a beam that blinks rapidly at a first frequency. Likewise, when a first segment in either segment group 12c or 12e is illuminated, laser control circuitry 80 causes laser driver circuitry 82 and laser 84 to produce a beam that blinks rapidly at a second frequency. Laser control circuitry 80 can create a blinking beam by, for example, turning laser driver circuitry 82 on and off repeatedly, thereby supplying intermittent power to laser 84. The beam may be made to blink at, for example, 5 hertz when the device is rotated clockwise and 10 hertz when rotated counterclockwise. The user may surmise from the blinking laser beam that the device is not level. The user can also determine, from the frequency of blinking, whether the laser beam is inclined up or down with respect to level. Both blinking frequencies are preferably easily distinguishable from each other and from the slower blinking produced by a low battery condition, which will be described more fully below.

As previously stated, display segments 12a–12e, which are arranged to provide an easy-to-read and intuitive display, are largely redundant. Thus, laser control circuitry 80 may derive an indication of the position of the level by examining, for example, only a first segment from segment group 12b and a first segment from segment group 12c. These respective first segments are the segments closest to central segment 12a in their respective segment groups. If either one of these respective first segments is illuminated, then a non-level condition is indicated and a rapidly blinking laser beam is produced at the appropriate frequency, as previously described. Conversely, if neither one of the respective first segments is illuminated, then a level condition is indicated and a solid laser beam is produced. It will be understood that, due to the redundant nature of display 10, the above-described position indication may alternatively be derived from an examination of the respective first segments of segment groups 12d and 12e, or the respective first segments of segment groups 12c and 12d, or the respective first segments of segment groups 12b and 12e, or from an examination of directional arrows 14a–14d.

In an alternative embodiment, laser control circuitry 80 may derive an indication of the degree of inclination of the level by examining two or more segments from, for example, segment groups 12b and 12c. In this embodiment, laser control circuitry 80 modulates the beam produced by laser 84 according to the number of display segments that are illuminated. Laser control circuitry 80 may, for example, cause laser 84 to blink with a frequency proportional to the number of display segments illuminated. The blinking rate therefore indicates to the user the deviation of the level from level (or plumb), with a higher blinking rate indicating a greater degree of inclination. If none of the monitored segments are illuminated, then a level condition is indicated and a solid laser beam is produced.

Laser driver circuitry 82 and laser 84 may be activated or deactivated by means of a control switch (not shown) on the device. Thus, when a user wishes to use the device as a simple level, using display 10, laser driver circuitry 82 and laser 84 may be turned off, preserving battery power. In this mode, it is generally assumed that a moderate level of precision in the inclination display is sufficient. When a user wishes to derive an extended level (or plumb) indication, laser driver circuitry 82 and laser 84 may be turned on. In this mode, since the laser beam may extend 150 feet or more from the device, it is generally assumed that a very high level of precision in the inclination display is desired.

Thus, when laser driver circuitry 82 and laser 84 are turned on, inclination display resolution indicator 15 is illuminated, indicating an "EXTREME" level of precision. In this mode, the level of inclination which causes each inclination indicator segment 12b–12e to illuminate is decreased compared to the normal mode of operation. Thus, in a normal mode of operation with laser driver circuitry 82 and laser 84 turned off, each inclination indicator segment 12b–12c may indicate, for example, 1/32 of an inch of inclination per linear foot. In the "EXTREME" precision mode, with laser driver circuitry 82 and laser 84 turned on, each inclination indicator segment 12b–12e may indicate, for example, 1/64 of an inch of inclination per linear foot. Thus, if the device is inclined sufficiently to illuminate a first inclination indicator segment in any segment group 12b–12e, laser 84 will blink at an appropriate frequency to indicate the direction of inclination, as previously described.

Laser control circuitry 80 also receives the low battery signal from low battery detector 72. If low battery detector 72 detects a low battery condition, laser control circuitry 80 causes laser driver circuitry 82 and laser 84 to produce a slow flashing laser beam. Because laser 84 creates a significant drain on battery 48, the slow flashing beam is designed to extend the useful life of battery 48, while still providing a laser beam indication of the level or plumb line. Thus, laser control circuitry 80 may, for example, turn on laser driver circuitry 82 and laser 84 for one-third to one-half of a second every two or three seconds. This may extend the useful life of battery 48 in the low battery state by up to nine times.

In addition to the above-described visual displays, each unique display state is associated with a certain tone from tone generator 60 for audible user feedback, with the exception that when all of the either four right hand or left hand inclination segments indicating maximum inclination are on (illuminated), no tone output occurs. The same set of tone frequencies is used for inclination bars 12b, 12d and for 12c, 12e. (In another embodiment, the tone is provided only for level or plumb; in yet another embodiment, one tone indicates level/plumb and another not level/plumb.)

All four primary quadrants of inclination are similarly treated, with the exception that the averaged data polarity is reversed in the plumb and inverted plumb quadrants. This polarity change is due to the physical relationship of pairs of sensor 34 electrodes A, B, C, D. For example, in the Level quadrant, electrodes B and C are active with B being on the right. But in the plumb quadrant, electrodes A and B are used with B now being on the left. This change from right to left changes the polarity of the resulting data.

Data Filter

A Moving Average Filter 56 is included in the level to further reduce system mechanical noise due to small movements in the level caused by the user. Increasing the number of averaged excitation cycles would reduce this noise, but at the expense of reduced throughput or slower response time. Adding digital filter 56 while retaining the number of averaged cycles advantageously does not slow the response, other than an initial time lag to recognize level rotation that exists longer than two average cycles.

This moving average filter improves on the averaging technique disclosed in U.S. Pat. No. 5,313,713 and above where only a single, historical averaged result is compared to the current result. (It is to be understood that this moving average filter is not essential to operation of the presently disclosed level.)

The moving average filter 56 averages (takes the mean of) the last four FDAC 38 (Fine DAC) codes (the current and most recent last three FDAC digital values) with the result of this average controlling whether the display is incremented CW, CCW or held in the current state. A four bit Up/Down counter (not shown) is embedded in the filter 56, to supply the four bit output to adder 64. This counter increments/decrements the resultant FDAC code as described above and the output signal of the counter is also value d(n) in FIG. 3.

Given the single bit binary output ("DATA") of the averager 54 to be a(n), the FDAC 38 code d(n) is updated as follows:

$$d(n) = d(n-1) + 1 \quad \text{if} \quad a(n) = 1 \quad (1)$$
$$d(n-1) - 1 \quad \text{if} \quad a(n) = 0$$

That is, the FDAC code is incremented by one if the average result is one and decremented by one if the average result is zero.

This is equivalent to:

$$d(n) = d(n-1) + 2a(n) - 1 \quad (2)$$

Averaging the last four FDAC codes gives:

$$f(n) = \frac{d(n) + d(n-1) + d(n-2) + d(n-3)}{4} \quad (3)$$

From Equations (1) and (2):

$$d(n-1) = d(n) - 2a(n) + 1 \quad (4)$$
$$d(n-2) = d(n) - 2a(n) - 2a(n-1) + 2 \quad (5)$$
$$d(n-3) = d(n) - 2a(n) - 2a(n-1) - 2a(n-2) + 3 \quad (6)$$

Substituting (4), (5), and (6) into (3):

$$f(n) = d(n) + \frac{3a(n) - 2a(n-1) - a(n-2)}{2} \quad (7)$$

This formula can be implemented in microprocessor/controller 50 by a computer program operating as described above or in logic circuitry.

Figure 3:
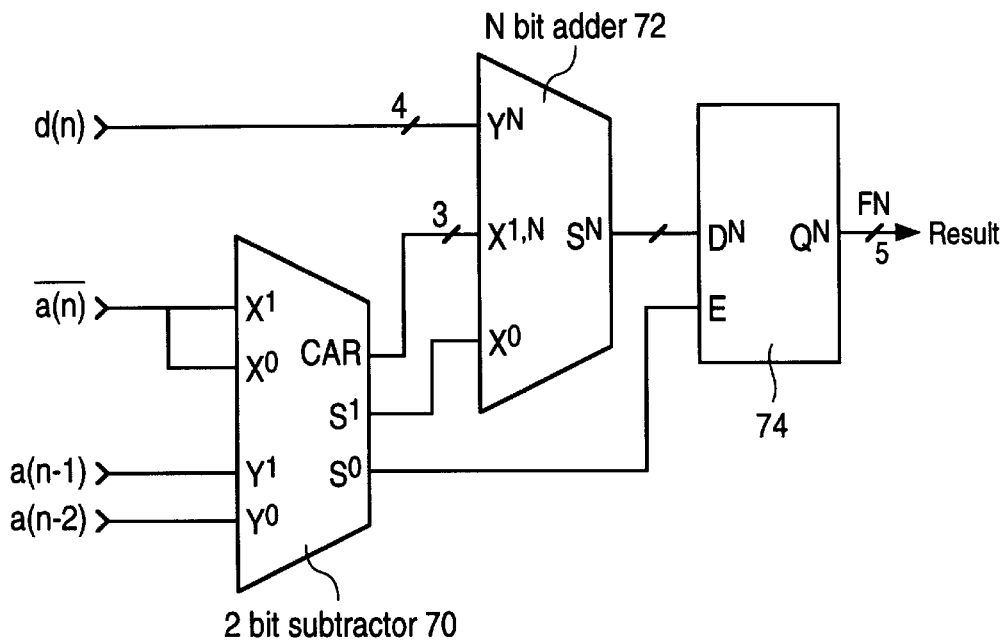
FIG. 3 shows a filtering circuit in accordance with the invention.

A logic circuitry implementation of filter 56 is shown in FIG. 3 using a two bit subtractor (utilizing two's complement addition) 70 having four input terminals receiving values from a shift register (not shown) representing the last three values of the averager output d(n), d(n−1), d(n−2). A three bit result of subtractor 70 (carry, $S^1$, $S^0$, is processed by dropping the LSB (least significant bit $S^0$) to divide by 2 and adding the result to value d(n) in N bit adder 72. Value d(n) is the output signal of the above mentioned four bit up/down counter, the output signal of which is provided to adder 64. The LSB ($S^0$) of the output of subtractor 70 is then used, via an N-bit set of flip-flops 74, to either retain the previous display position (where $S^0$=0) or use the new result $S^N$ from the output of adder 72 (where $S^0$=1) as the output signal F(N) and is provided to display logic 58. The circuitry of FIG. 3 hence serves as an explanation of the computation and is readily embodied in a computer program by one skilled in the art.

Weighted Display Processing

With display processing such as that described in U.S. Pat. No. 5,313,713, each display segment or "bin" has an identical size (range) as related to the inclination of the level. That is, if each segment has a value of 2 arc minutes of inclination, with a nine segment display as in FIG. 1A the display range is (9–2)×2 arc minutes or 14 arc minutes. This is shown graphically in FIG. 4A where the "level" (center) bin is shown heightened for emphasis.

It is desirable for accuracy to have a level (or plumb) indication having a rather small "window" (e.g., 2 arc minutes), but at the same time, have an overall display range wide enough to be easily used. The previous example of a 14 arc minute display range is very difficult to use in actual practice as being too narrow.

By increasing the number of "bins" and combining certain bins to enable certain display segments, a weighted, or non-linear display is achieved that desirably retains a narrow center window while giving a larger end-to-end overall range.

For example, when seventeen processor "bins" as described above are combined as shown graphically in FIG. 4B, the end-to-end range is increased to 30 arc minutes, while keeping a narrow center window of 2 arc minutes. The result is a doubling of display range while retaining accuracy where it is required, at the center. This function may be carried out by a control program in microprocessor 50 or by logic circuitry (not shown), using the above described processing steps. The resulting display of FIG. 1A has fewer segments than processing bins, with an attendant increase in the ease of use and interpretation.

This disclosure is illustrative and not limiting; further modifications will be apparent to one skilled in the art in light of this disclosure and are intended to fall within the scope of the appended claims.

I claim:

1. An inclination device comprising:

a housing;

a sensor mounted on the housing, the sensor determining an inclination of the inclination device relative to a null inclination;

a light source mounted on the housing, the light source being operable to generate a light beam suitable for projecting a visual manifestation onto a surface; and a light source controller operable to receive an inclination indication signal from the sensor, and operable to alter a visual characteristic of the light beam in response to the inclination indication signal.

2. The inclination device of claim 1, further comprising a visual display on the housing operatively connected to the sensor and displaying the determined inclination, the visual display including a plurality of illuminated non-parallel and adjacent segments, each segment representing a predetermined sequential increment of inclination and each segment being arranged at a different angle relative to a longitudinal axis of the housing, a particular number of segments being illuminated for each determined inclination.

3. The inclination device of claim 1, further comprising a power source connected to the light source and operable to supply power to the light source, wherein the light source controller is operable to modulate the power supplied to the light source by the power source in response to the inclination indication signal.

4. The inclination device of claim 3, wherein the power source comprises a battery mounted in the housing.

5. The inclination device of claim 1, wherein the light source comprises a laser.

6. The inclination device of claim 1, wherein the sensor comprises:

a plurality of capacitors, each capacitor having a capacitance;

a fluid operable to change the capacitances of the capacitors in response to the inclination of the inclination device.

7. An inclination device comprising:

a sensor operable to determine an inclination of the inclination device relative to a null inclination, the null inclination being defined relative to a gravitational direction the sensor being further operable to generate an inclination indication signal indicative of the inclination of the inclination device;

a housing in which the sensor is mounted, the housing defining a longitudinal axis;

a laser mounted on the housing and operable to generate a light beam parallel to the longitudinal axis; and a laser controller operable to receive the inclination indication signal from the sensor, and operable to selectively provide power to the laser in response to the inclination indication signal.

8. The inclination device of claim 7, further comprising a visual display on the housing operatively connected to the sensor and displaying the determined inclination, the visual display including a plurality of illuminated non-parallel and adjacent segments, each segment representing a predetermined sequential increment of inclination and each segment being arranged at a different angle relative to the longitudinal axis of the housing, a particular number of segments being illuminated for each determined inclination.

9. The inclination device of claim 7, further comprising a power source connected to the light source and operable to supply power to the light source, wherein the light source controller is operable to modulate the power supplied to the light source by the power source in response to the inclination indication signal.

10. The inclination device of claim 9, wherein the power source comprises a battery mounted in the housing.

11. The inclination device of claim 7, wherein the sensor comprises:

a plurality of capacitors, each capacitor having a capacitance;

a fluid operable to change the capacitances of the capacitors in response to the inclination of the inclination device.

12. A method of indicating angular deviation of an inclination device defining a longitudinal axis, the method comprising:

generating a light beam by a light source mounted on the inclination device;

sensing the angular deviation of the inclination device from a null position;

providing an indication of the angular deviation to a light source controller; and modulating the light beam by the light source controller in response to the indication of the angular deviation.

13. The method of claim 12, wherein modulating the light beam comprises supplying intermittent power to the light source by the light source controller.

14. The method of claim 12, further comprising projecting the light beam on a surface to generate a beam spot.

15. The method of claim 12, wherein generating the light beam comprises generating a laser beam parallel to the longitudinal axis.

16. The method of claim 12, further comprising:

providing on the inclination device a display having a plurality of non-parallel and adjacent segments;

sensing an amount of the angular deviation of the level from a null position;

illuminating one or more of the segments to indicate each amount of angular deviation of the level, each illuminated segment indicating an incremental deviation of inclination from the null position.

17. The method of claim 12, further comprising:

establishing the null at which the level indicates no inclination; and setting the null to be other than level or plumb relative to a plane of the earth's gravitational field.

* * * * *

UNITED STATES PATENT AND TRADEMARK OFFICE
CERTIFICATE OF CORRECTION

PATENT NO.    : 6,037,874
ISSUE DATE    : 03/14/2000
INVENTOR(S)   : Gregory Heironimus et al.

It is certified that error appears in the above-identified patent and that said Letters Patent is hereby corrected as shown below:

Title page, "[75] Inventor:", please delete "Gregory Heironimus, San Jose, Calif." and substitute -- Gregory Heironimus and Norman L. Krantz, San Jose, Calif.--

Signed and Sealed this

Tenth Day of April, 2001

*Attest:*

NICHOLAS P. GODICI

*Attesting Officer*    *Acting Director of the United States Patent and Trademark Office*